April 18, 1939. M. ROSSI 2,154,584
MILK CONTAINER
Filed Oct. 25, 1937
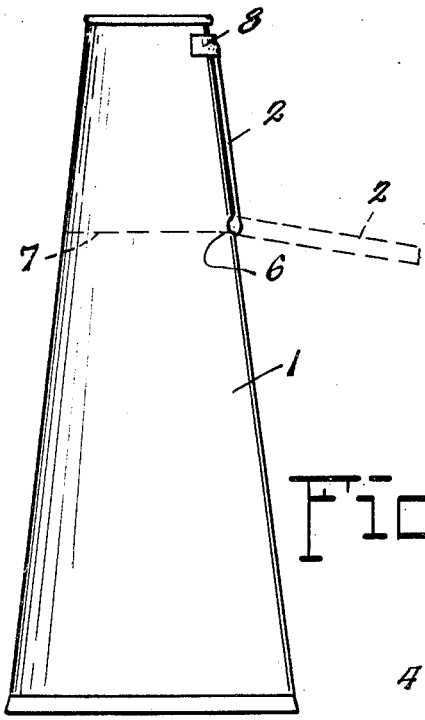
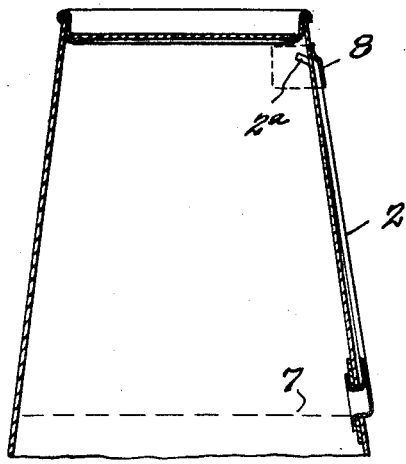
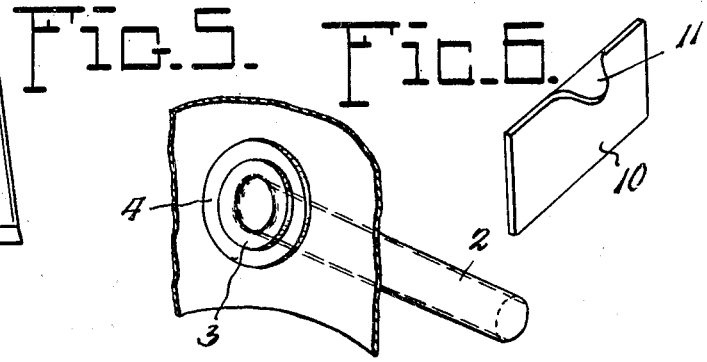
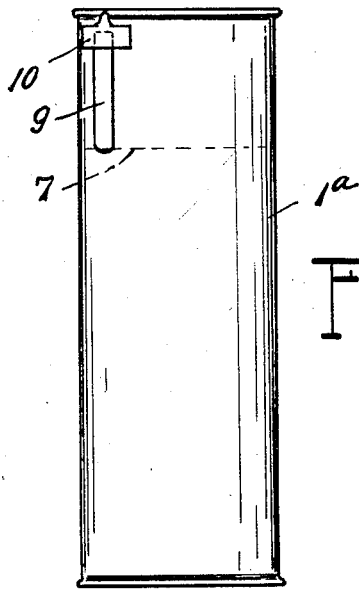
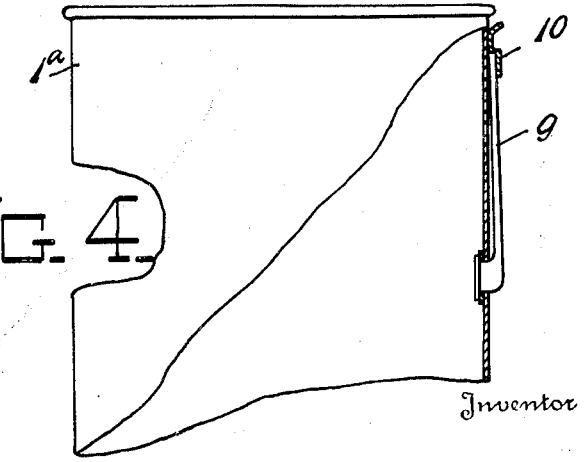
Inventor
MARIANO ROSSI.
By Robert Cobb
Attorneys Patented Apr. 18, 1939

2,154,584

UNITED STATES PATENT OFFICE 2,154,584

MILK CONTAINER

Mariano Rossi, Cleveland, Ohio

Application October 25, 1937, Serial No. 170,833

6 Claims. (Cl. 229—7)

This invention appertains to the art of packaging liquids, primarily, and especially to the construction of receptacles made of paper, composition sheet material, or the like, employed largely today in substitution for ordinary glass milk bottles.

It is known that upon the delivery of milk in bottles or paper or like receptacles, during the period between the time of packaging the milk and its use, a certain amount of cream rises to the upper portion of the receptacle. It is desirable that this cream be separated from the body of milk beneath it in the receptacle, and some types of glass bottles have been designed to provide a sort of cream compartment at their upper ends. Generally heretofore, however, the separating of the cream from the milk has been required to be accomplished by tilting the receptacle and pouring the cream from the upper end of the receptacle. A certain amount of guess-work is thus entailed since it is difficult to calculate accurately the point at which the lower cream line begins or the upper milk line terminates.

The object of this invention has been to provide an adjustable and preferably flexible spout member connected with the liquid receptacle for the milk and cream, at a point between its ends, which point is defined fairly accurately as the separation line between the milk and cream. The spout member used has its inlet connection with the receptacle at said particular separation line, and is, according to the invention, normally adjusted to lie closely against the side of the receptacle when not in use, and to have its upper open end sealed in one way or another. When the contents of the receptacle, milk and cream, have reached the user and it is desired to pour off the cream, so to speak, from the milk, the user is able to merely pull the spout member away from its position against the side of the receptacle into a slightly downwardly inclined position, and this will have the effect of permitting the cream content of the receptacle to pass through the spout member into a pitcher or some other vessel arranged to receive it.

The invention lies primarily in the peculiar construction of the spout member, its arrangement upon the receptacle, and the mode of sealing said spout member or adjusting it so that it is inoperative except for its particularly designed purpose.

In the accompanying drawing:

Figure 1 is a side elevation of one type of receptacle, such as made of paper, or the like, equipped with the spout structure of my invention, dotted lines showing the spout as when pulled out and down ready to be used for carrying off the cream at the top of the receptacle.

Figure 2 is a fragmentary vertical sectional view, enlarged, of the upper portion of the receptacle, bringing out more clearly the method of sealing the upper end of the spout member when not in use.

Figure 3 is a view in elevation of a modified form of receptacle and spout structure as well.

Figure 4 is an elevational view of the spout structure and receptacle of Figure 3, certain portions of the receptacle being shown in section.

Figure 5 is a fragmentary perspective view showing more clearly the manner of uniting the inlet end of the spout structure to the wall of the receptacle to which it is connected.

Figure 6 is a perspective view of the sealing member employed with the spout structure illustrated in Figures 3 and 4.

In the drawing similar reference characters refer to similar parts.

Describing the invention in detail in respect to the forms thereof illustrated in the drawing, Figures 1, 2, and 5 will first be referred to. The receptacle with which the invention is used may take the tapering form of Figure 1, or the cylindrical form of Figure 3, or many other different forms of the commercial receptacles such as are commonly in use today, with the exception of those made of glass or like ware. The receptacle is designated 1 and near its upper end is located the spout structure which includes the spout member 2. This spout member 2 may be equipped with a flange portion 3 at its lower inlet end seated against a paper or like gasket 4 applied to the wall of the receptacle 1 internally thereof, see Figure 5. The parts 3 and 4 may be united to each other and to the wall structure by the impervious coating substance that is usually applied to the receptacle 1 both interiorly and exteriorly.

The spout member 2 is preferably made of a paper or similar flexible material, and lends itself therefore to being united to the similar material from which the receptacle 1 is made. The spout member 2 is tubular, of course, and open at its inlet end to the interior of the receptacle 1, said inlet end shown in Figure 1 at 6 to be located approximately at the cream separation line shown in dotted lines in Figures 1 and 3 and designated 7.

At its upper end, before use thereof, the spout member 2 is, according to Figures 1 and 2, interlocked with the upper end portion of the receptacle 1 by being passed through a slit or opening and thus the upper extremity of the spout member projects into the receptacle as shown at 2a in Figure 2. When so disposed, the body of the spout member lies flat against the outer wall portion of the receptacle 1, the fact that the spout member is made of paper or similar flexible material enabling the flattening thereof so as to avoid its projection from the receptable any more than absolutely necessary. Owing to this flattened arrangement of the spout member against the receptacle, there is little likelihood of the same becoming accidentally displaced from its normal inoperative position in the ordinary handling of the liquids packaged in the said receptacles.

In order to drain the portion of the cream in the receptacle 1 above the cream line 7, it is only necessary to break the sealing member 8 comprising a label or like sealing member arranged over the upper end portion of the spout member 2. The said seal closes the opening in the wall of the receptacle 1 through which said upper end of the member 2 passes. Upon breaking said sealing member 8 by simply pulling the same off the spout member 2 and the receptacle 1, the member 2 may be lowered to the dotted line position of Figure 1, and under these conditions the portion of the liquid in the receptacle above the so-called cream-separation line 7 will pass out of the receptacle into a suitable vessel arranged to receive it.

In the construction of Figures 3 and 4 the upper end of the spout member 9 is not inserted through an opening in the wall of the receptacle 1a but is merely disposed flat against the outer surface of the receptacle and covered by the sealing member 10, the latter being of the form shown best in Figure 6 and having a pulling tab 11 for facilitating its removal from a position adhering to the receptacle 1 and part 9, and in which position it closes the upper end of the spout, preventing air from entering the same and affecting the fluid contents of the receptable 1a.

My invention is very simple in reference to the spout member structure, affords advantages in respect to the assemblage of the structure upon the receptacle, and is especially advantageous in regard to the facility with which the spout member may be put into use for the purposes described.

Having thus described my invention, what I claim as new and desire to secure by Letters Patent of the United States, is—

1. In combination with a receptacle of the class described, a spout member carried by the receptacle and comprising a tubular structure having an inlet end united to and communicating with the interior of the receptacle between the upper and lower ends of the same, said spout member bing flexible and pressed so as to lie flat against the outer surface of the receptacle.

2. As a new article of manufacture, a milk receptacle having combined therewith a spout member freely movable from a position in which it lies against the outer wall of the receptacle to a position in which it may incline so as to discharge a portion of the contents of the receptacle, said spout member comprising a tubular structure the inner end of which is united to and in communication with the interior of the receptacle at approximately the cream separation line of the receptacle when milk is contained in the latter, the said spout member being normally folded flat against the outer surface of the receptacle, and sealing means for the outer end of said spout member.

3. A milk container as set forth in claim 2, in which the sealing means for the outer end of the spout member closes the spout member as well as connects the same with the receptacle.

4. As a new article of manufacture, a milk receptacle having combined therewith a spout member freely movable from a position in which it lies against the outer wall of the receptacle to a position in which it may incline so as to discharge a portion of the contents of the receptacle, said spout member comprising a tubular structure the inner end of which is united to and in communication with the interior of the receptacle at approximately the cream separation line of the receptacle when milk is contained in the latter, the receptacle having an opening in the side thereof to receive the free or outer end of the spout member, and sealing means for closing the opening in which the said free or outer end of the spout member is received after the free end of the spout has been inserted therein.

5. As a new article of manufacture, a milk container of paper or like material, a spout structure carried thereby and made of paper or like material and comprising a tubular spout member sufficiently flexible that normally it lies pressed flat against the outer wall of said receptacle, connecting means between one end of the tubular spout structure and the receptacle establishing communication with the interior of the receptacle, and securing means for holding the spout member flat against the outer wall of the receptacle.

6. A milk container as claimed in claim 5, said securing means consisting of a seal affixed to the receptacle and closing the outer end of the spout member as well as connecting the latter to the receptacle.

MARIANO ROSSI.